United States Patent
Karpus et al.

[11] Patent Number: 5,884,191
[45] Date of Patent: Mar. 16, 1999

[54] INTERFACE SYSTEM FOR PROVIDING HANDS-FREE OPERATION OF A RADIOTELEPHONE AND ACCESSORIES IN A MOBILE OFFICE ENVIRONMENT

[75] Inventors: Thomas Joseph Karpus, Apex; Patrik Hans Lilja, Raleigh, both of N.C.

[73] Assignee: Ericsson Inc., Research Triangle Park, N.C.

[21] Appl. No.: 706,660

[22] Filed: Sep. 6, 1996

[51] Int. Cl.[6] .................................................. H04M 11/00
[52] U.S. Cl. ........................ 455/557; 455/569; 379/93.11
[58] Field of Search .................................. 455/31.1, 550, 455/556, 557, 559, 568, 569; 379/93.09, 93.11, 156, 157

[56] References Cited

U.S. PATENT DOCUMENTS

| | | | |
|---|---|---|---|
| 4,558,178 | 12/1985 | Yasuda et al. | 455/567 |
| 4,972,457 | 11/1990 | O'Sullivan | 455/556 |
| 5,109,402 | 4/1992 | Anderson et al. | 455/557 |
| 5,191,602 | 3/1993 | Regen et al. | 379/419 |
| 5,416,828 | 5/1995 | Hiramatsu et al. | 455/557 |
| 5,426,689 | 6/1995 | Griffith et al. | 455/568 |
| 5,602,902 | 2/1997 | Satterlund et al. | 455/557 |
| 5,722,085 | 2/1998 | Horikawa | 455/557 |

FOREIGN PATENT DOCUMENTS

| | | |
|---|---|---|
| 2 157 923 | 10/1985 | United Kingdom . |
| WO 87/00718 | 1/1987 | WIPO . |
| WO 90/03076 | 3/1990 | WIPO . |

*Primary Examiner*—Willis R. Wolfe
*Attorney, Agent, or Firm*—Jenkens & Gilchrist

[57] ABSTRACT

An interface system for connecting various accessory devices to a radiotelephone and arbitrating between conflicting requests for access to the audio channel of the radio telephone by the accessory devices. Included is a controller for controlling operation of the interface system and a switch for connecting the audio channel of the selected accessory to the audio channel of the radiotelephone. A method is also provided for entering user selected operational settings for controlling operation of the interface system and prioritizing access to the radiotelephone.

9 Claims, 5 Drawing Sheets

|  | INPUTS | | | OUTPUTS | | | CONNECTION PATH |
|---|---|---|---|---|---|---|---|
|  | C1 | C2 | C3 | CO1 | CO2 | CO3 |  |
| S1 | 0 | 0 | 0 | 0 | 0 | 0 | CONNECTION TO HANDSET |
| S1 | 0 | 0 | 1 | 0 | 0 | 0 | |
| S1 | 0 | 1 | 0 | 0 | 0 | 0 | |
| S1 | 0 | 1 | 1 | 0 | 0 | 0 | |
| S2 | 1 | 0 | 0 | 0 | 1 | 0 | CONNECTION TO MODEM |
| S2 | 1 | 0 | 1 | 0 | 1 | 0 | |
| S3 | 1 | 1 | 0 | 1 | 0 | 0 | CONNECTION TO SPEAKERPHONE |
| S4 | 1 | 1 | 1 | 0 | 0 | 1 | TELEPHONE ISOLATED |

INTERFACE SYSTEM FOR PROVIDING HANDS-FREE OPERATION OF A RADIOTELEPHONE AND ACCESSORIES IN A MOBILE OFFICE ENVIRONMENT

BACKGROUND OF THE INVENTION

1. Technical Field of the Invention

The present invention pertains in general to cellular telephones and devices which use cellular telephones for mobile communication, and more particularly, to the connection of a portable computer via a modem to a cellular telephone.

2. Description of Related Art

The growing use of cellular telephones and accessory devices such as speakerphones, portable computers, and portable facsimile machines is allowing many people to perform their jobs while away from their home and office. In particular, the use of cellular data modems in conjunction with laptop computers allows people to receive and send facsimiles and access local area networks while in a mobile office environment.

A shortcoming of sending and receiving facsimiles via a cellular telephone is that the modem must be repeatedly connected and disconnected, to and from, the cellular telephone when the user wishes to send or receive a facsimile or place or receive a voice telephone call, respectively. Furthermore, in situations where a user does not know when an incoming facsimile will be transmitted, the user must keep the modem connected to the cellular telephone. Maintaining this connection disables voice calls and prevents the cellular telephone user from using the cellular telephone to place or receive voice calls. Repeated connecting and disconnecting of the modem is especially bothersome for users while driving an automobile when the user's hands are not readily available. Besides being bothersome, this distraction is also dangerous to the user while driving an automobile.

There currently is no acceptable method by which a user of a cellular telephone can place and receive voice calls without physically disconnecting the modem from the cellular telephone. Generally, a cellular telephone user who wishes to avoid connecting and disconnecting the modem when making voice calls is forced to use two separate telephones with different telephone numbers. There is a need, therefore, for an interface system capable of connecting a plurality of accessories, including at least a modem, to a radiotelephone and coordinating access by these devices to the audio channel of the radiotelephone without manual intervention by the cellular telephone user. It would also be advantageous for such an interface system to allow the user of the cellular telephone to prioritize operation of the various accessories connected to the cellular telephone.

SUMMARY OF THE INVENTION

An embodiment of the present invention comprises an interface system for connecting various accessory devices to a radiotelephone. The bidirectional audio channel of each accessory is connected to a switch within the interface system. Each accessory is also connected to a controller within the interface device by an individual request line for each accessory. When an accessory device requires access to the audio channel of the radiotelephone, the accessory sends a request to the controller of the interface device via the request line. If more than one device makes a request for access to the radiotelephone at the same time, the controller arbitrates between the competing devices after the controller determines which accessory will be granted access, the controller instructs the switch to connect the selected accessory to the radiotelephone.

In a further embodiment, the interface system also allows the user of the interface to input operational settings. These settings are used to select a hierarchy scheme for the various accessories and control operations of the interface system.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1A:
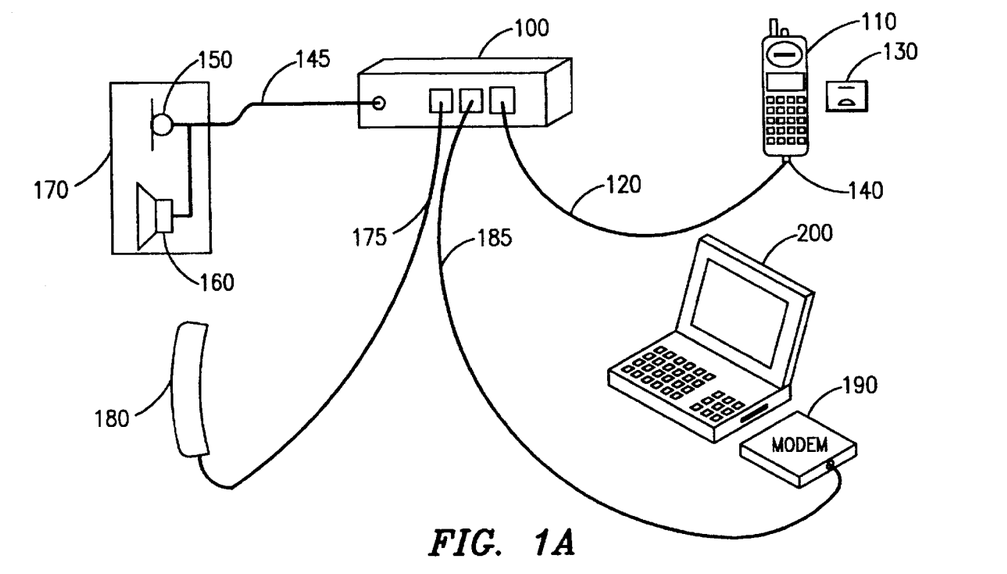
FIGS. 1A and 1B illustrate a physical rendering of two embodiments of the present invention, FIG. 1A having a centrally located interface system and FIG. 1D having a centrally located portion of the interface system and a remotely located portion external to the centrally located interface system.
Figure 1B:
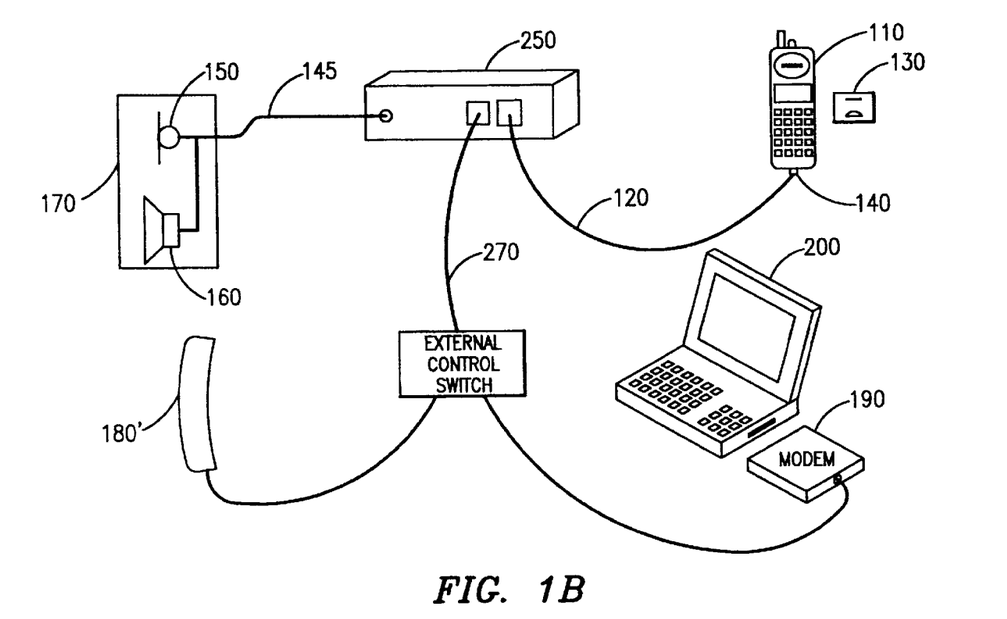

Referring now to FIG. 1A and FIG. 1B, there is illustrated a physical rendering of two embodiments of the present invention. FIG. 1A illustrates a first embodiment of the present invention comprising a centrally located interface system 100 having a radiotelephone 110 connected to the interface system via a communication link 120. Connection to the communication link 120 is effectuated using a connector 140. A docking station 130 is also provided for holding the radiotelephone. While FIGS. 1A and 1D show the radiotelephone connected to the communication link 120 via connector 140, this connector can be incorporated into the docking station 130.

A first accessory is a speakerphone 170 having a microphone 150 and a speaker 160 connected to the interface system 100 via a communication link 145. A second accessory is handset 180 connected to the interface system 100 via a communication link 175. When the interface system 100 is placed in an automobile, the handset 180 can be located anywhere within the automobile and used by any occupant including the driver. While the present invention still allows a user to directly use the cellular telephone 110, it is likely that the cellular telephone 110 will be placed in the docking station 130 in order to effectuate other connections such as to a higher powered transmitter and a remotely located antenna. Therefore, handset 180 allows easy access to the audio channel of the radiotelephone 110.

Also connected to the interface system 100 is a modem 190 connected via communication link 185. The modem 190 is further connected to a portable or laptop computer 200 in a conventional manner. For example, under current technology this connection may be made through the use of a Personal Computer Memory Card International Association (PCMCIA) card. Although the embodiment of the present invention shown in FIG. 1A only depicts three accessories connected to the interface device 100, the present invention accommodates any number of accessories for connection to an interface device 100 for providing access to the audio channel of a radiotelephone 110. Communication links 120, 145, 175, and 185 which connect the interface device 100 to radiotelephone 110, speakerphone 170, handset 180, and modem 190 respectively, all of FIG. 1A, are depicted as being a physical connection. This connection can be effectuated using an electrical cable for transmitting electrical signals or a fibre optic cable for communicating fibre optic signals. These connections can also be effectuated via wireless communications using the electromagnetic spectrum.

FIG. 1B depicts a second embodiment of the present invention wherein, the interface system 100 of FIG. 1A comprises a centrally located portion of the interface system 250 and a remotely located portion of the interface system 260 which is external to the centrally located interface portion 250. Together the centrally located portion 250 and the remotely located portion 260 constitute the interface system 100 of FIG. 1A. The externally located portion 260 connects to the centrally located portion 250 via a communication link 270. Again, this communication link 270 can be an electrical cable for transmitting electrical signals, a fibre optic cable for transmitting fibre optic signals, or a wireless link using the electromagnetic spectrum. Although the external portion of the interface system 260 is remotely located from the centrally located portion of the interface system 250, the external portion 260 in one embodiment is under the control of the centrally located portion 250 and in another embodiment, is controlled by the cellular telephone user.

The external portion of the interface system 260 is remotely located from the centrally located portion 250 in order to simplify connection of remote accessory devices to the centrally located portion of the interface system 250. In the embodiment shown in FIG. 1B, the handset 180 is connected to the external portion of the interface system 250 via communication link 280 and the modem 190 is connected to the external portion of the interface system 250 via communication link 290. Again, communication links 280 and 290 can be effectuated using any of the media previously described.

Figure 2:
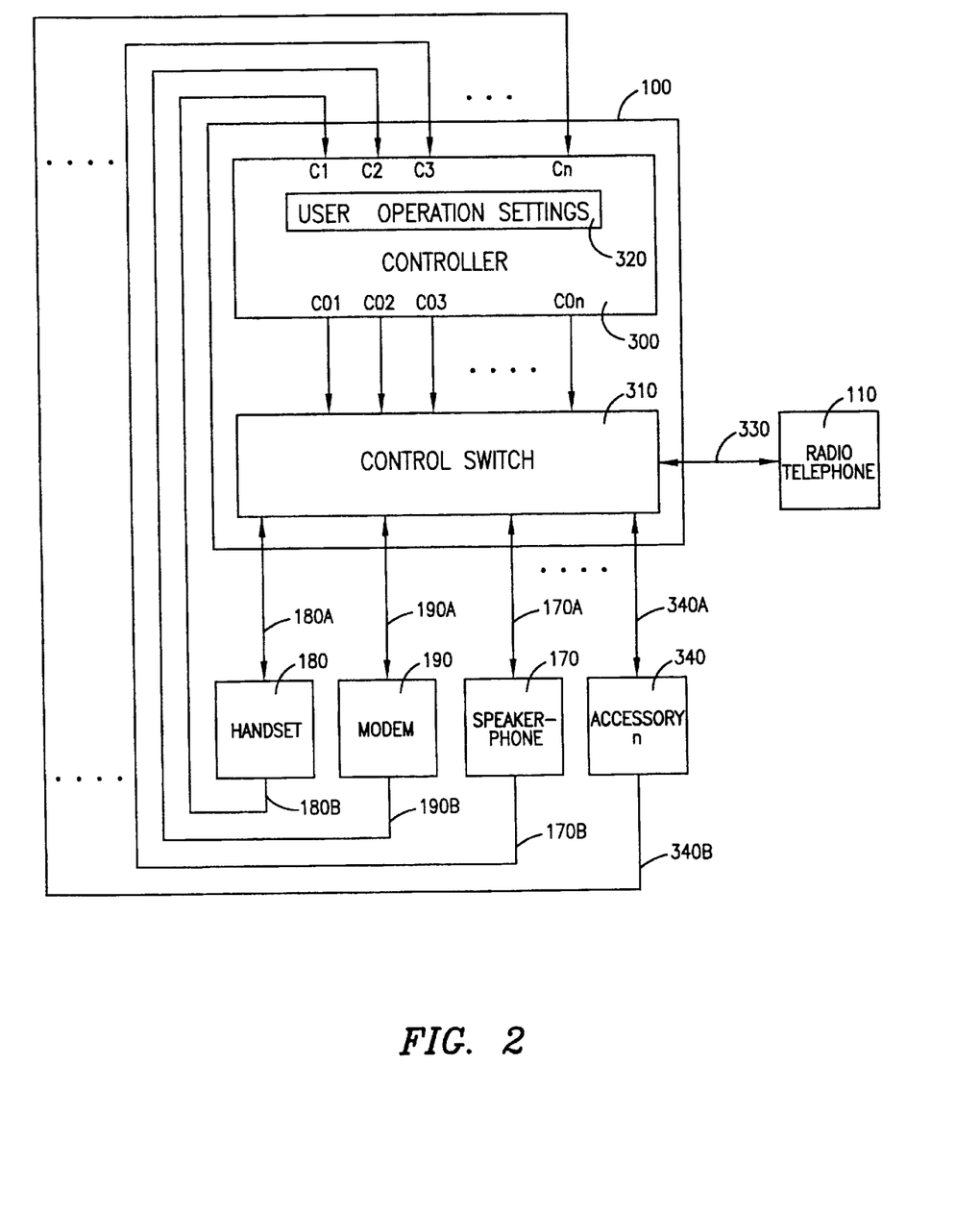
FIG. 2 illustrates a functional block diagram for an interface system of the present invention.

Referring now to FIG. 2, there is illustrated a functional block diagram for an interface system of the present invention. The interface system 100 is comprised of a controller 300 and control switch 310. The controller 300 allows the user of the interface system 100 to input is operational settings through a user operation setting function 320. Any conventional manner may be used to enter the settings and includes, but is not limited to, such methods as physically activating switches on a face plate of the interface device 100 or through voice commands using the radiotelephone handset 180 or speakerphone 170. Another method for inputting these user selected settings is through the use of the radiotelephone 110 or handset 180 keypad. The user selected settings can be used to prioritize operation of the various accessories and control functioning of the interface device 100.

The control switch 310 of the interface system 100 connects audio channels of the accessory devices to the audio channel of the radiotelephone 110 under the direction of the controller 300 based on user selected operational settings and requests for access by the accessories. The audio channel of handset 180, modem 190, speakerphone 170, and accessory "n" 340 connect to the control switch 310 via bidirectional communication links 180A, 190A, 170A, and 340A respectively. Under the control of controller 300, the control switch 310 connects the audio channel of the selected accessory to the audio channel of the radiotelephone 110 via bidirectional communication link 330.

Requests to the controller from the handset 180, modem 190, speakerphone 170, and accessory "n" 340 are transmitted via request links 180B, 190B, 170B, and 340B respectively. As with all communication links of the present invention, all request links can he effectuated using electrical cables for transmitting electrical signals, fibre optic cable for transmitting fibre optic signals, and the electromagnetic spectrum for effectuating wireless communications. Requests for access to the audio channel of the radiotelephone 110 communicated from the accessories over request links 180D, 190B, 170B and 340B enter the controller 300 via inputs C1, C2, C3 and Cn, respectively. Using these requests and user selected operational settings, the controller 300 arbitrates between requests for access from the various accessories and controls operation of the control switch 310 via controller outputs C01, C02, C03, and C0n. Based on the controller output signals, the control switch 310 selectively connects one of the accessories to the audio channel of the radiotelephone 110.

Requests by the accessories for access to the radiotelephone 110 can be accomplished in any number of ways. While complicated systems using interrupt or polling schemes can be employed, the preferred embodiment of the present invention simply transmits a logical "0" or "1" state on the request link of the associated accessory device to the controller 300. Transmitted requests by the accessories are received by the controller 300 via control input lines C1–C3. Generating the logical, "0" and "1" state for requesting access to the radiotelephone 110 can he easily accomplished. For example, handsets of most phones come equipped with a latching switch which activates the telephone when the handset is lifted off the cradle. This latching switch can be connected to the request link 180B such that when the handset is picked up the appropriate state is transmitted to the controller input C1. Similarly, the speakerphone 170 can activate the request link 170D either by the user activating a switch on the speakerphone 170 or through a voice command using speech recognition. In the case of the modem 190, the request link 190B can be activated using a request signal already available on PCMCIA modems.

The various accessories can be informed when they have been granted access to the audio channel of the radiotelephone 110. Separate grant lines can be used to communicate an access grant from the controller 300 to the various accessories devices or as in the case of PCMCIA modems the same request link can be used to provide notification of an access grant. Although cellular telephones do not provide a dial tone, another method to provide notification of an access grant is to provide a simulated dial tone. In the case of a handset 180 or a speakerphone 170, the cellular telephone user is made aware of an access grant by hearing the simulated dial tone. Although PCMCIA modems do not currently detect dial tones, other modems can detect the dial tones to determine that access to the radiotelephone 110 audio channel has been granted.

The bidirectional audio channel communication link for each of the accessory devices together with the access request link of each accessory device depicted in FIG. 2 form the communication links of FIGS. 1A and 1E. For example, the bidirectional communications link 180A of handset of 180 and the request link 180B together form the communication link 175 of FIG. 1A and 280 of FIG. 1B. Similarly, bidirectional communication link 190A and request link 190B of modem 190 form the communication link 185 of FIG. 1A and 290 of FIG. 1B. Likewise, bidirectional communication link 170A and access request link 170B of speakerphone 170 form the communication link 145 of both FIG. 1A and FIG. 1B.

Figure 3:
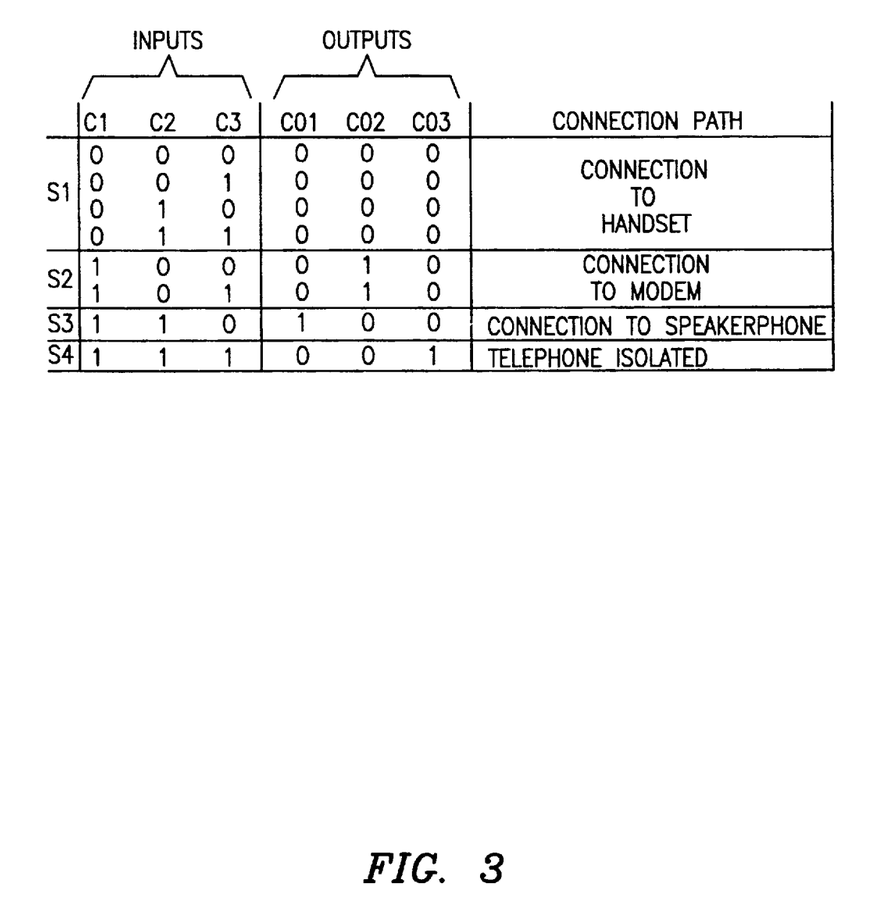
FIG. 3 illustrates a logic table depicting the control function for a preferred embodiment of an interface system.

In addition to FIG. 2, the following description further makes reference to FIG. 3, where there is illustrated a logic table depicting the control function 300 for a preferred embodiment of an interface system. The logic table includes input column headings C1, C2, and C3, and output column headings C01, C02, and C03. These inputs and outputs correspond to the same named input and output signals of the controller 300 of FIG. 2. The logic table is divided horizontally into sections S1, S2, S3, and S4 corresponding to the connection of one of the accessories to the audio channel of the radiotelephone 110. An active request for access to the audio channel of the radiotelephone 110 by an accessory is represented by a logical "0" under the input columns C1–C3. Section S1 includes the possible input value combinations and the unique output values which connect the handset 180 to the radiotelephone 110 audio channel. Section S2 includes the possible input value combinations and the unique output values which connect the modem 190 to the radiotelephone 110 audio channel. Section S3 includes the input values and the unique output values which connect the speakerphone 180 to the radiotelephone 110 audio channel. Finally, S4 includes the input values and the unique output values which disconnect all accessories from the radiotelephone 110.

Under the prioritization hierarchy of the preferred embodiment, preference is given to operation of handset 180. As such, whenever control input C1 is a logical "0" representing a request by the handset 180, the controller 300 provides control output values C01="0", C02="0", and C03="0" to the control switch 310 and the control switch 310 connects the handset audio channel to the audio channel of the radiotelephone 110. Since the handset 180 is given priority over all other devices, requests by the modem 190 and speakerphone 170 represented by logical "0" on control inputs C2 and C3 respectively have no effect on the control outputs C01–C03.

The preferred embodiment of the present invention gives second priority to operation of the modem 190. Section S2 of the logic table shows the situation where handset 180 is not requesting access as depicted by a logic "1" in column C1 and the modem 190 is requesting access as depicting by a logic "0" in column C2. In this situation, the controller 300 provides control output values C01="0", C02="1", and C03="0" to the control switch 310 and the control switch 310 connects the audio channel of the modem 190 to the audio channel of the radiotelephone 110.

The preferred embodiment of the present invention gives third priority to operation of the speakerphone 170. Section S3 shows the situation where the handset 180 and the modem 190 are not requesting access as depicted by a logic "1" in columns C1 and C2 respectively and the speakerphone 170 is requesting access as depicted by a logic "0" in column C2. In this situation, the controller 300 provides control output values C01="0", C02="1", and C03="0" to the control switch 310 and the control switch 310 connects the audio channel of the speakerphone 170 to the radiotelephone 110 audio channel.

Lastly, section S4 depicts the situation in which no accessory is requesting access to the audio channel of the radiotelephone 110 as depicted by logic value "1" for each of the inputs C1–C3. In this situation the radiotelephone 110 is isolated from all accessories.

Although, the logic table of FIG. 3 includes only three accessory devices the controller 300 and interface system 100 can expand to include any number of accessory devices. Likewise, the logic table does not show any user selected operational settings as inputs to the control function. Requests for access from additional accessories and user selected operational settings can be added to the logic table as additional inputs and the number of controller outputs can be expanded to include additional accessory devices such that any number of accessories and combination of prioritization schemes can be realized.

Figure 4:
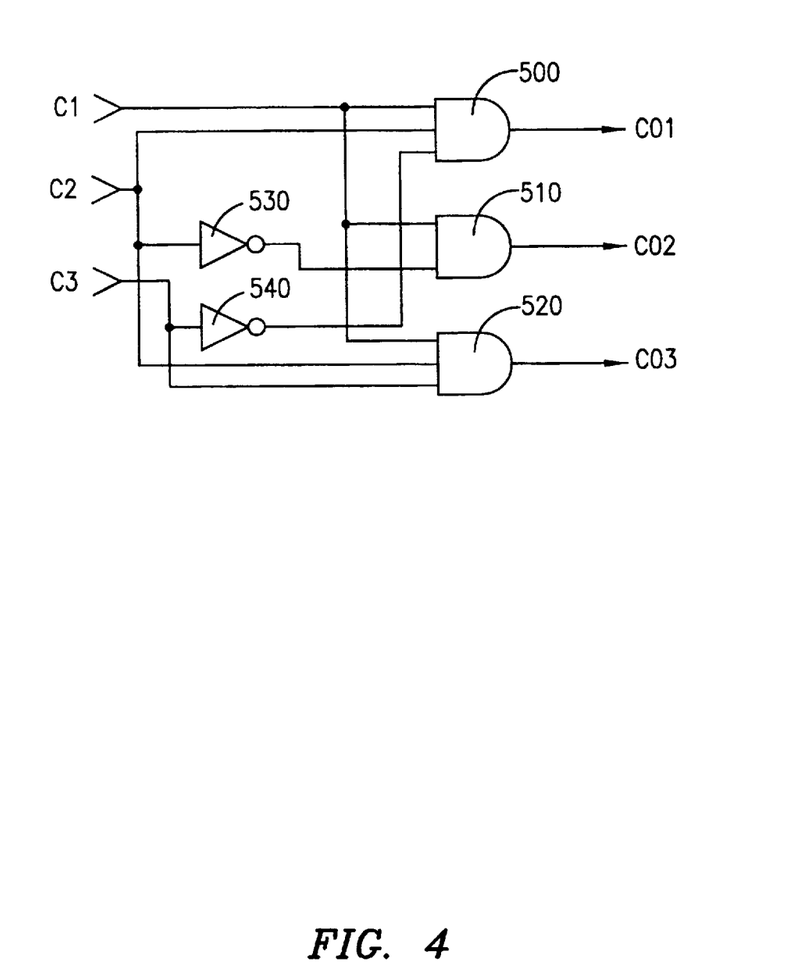
FIG. 4 illustrates a schematic of discrete logic used to implement the control function of FIG. 3.

Referring now to FIG. 4, there is illustrated a schematic of discrete logic used to implement the control function of FIG. 3. The schematic shows inputs C1–C3 representing the controller inputs C1–C3 of FIG. 2 and FIG. 3 and outputs C01–C03 representing the controller outputs C01–C03 of FIG. 2 and FIG. 3. The discrete logic includes three "AND" gates 500, 510, and 520 and inverters 530 and 540. These gates are connected as shown in the schematic such that when the inputs shown in columns C1–C3 of FIG. 3 are applied to the input C1–C3 of the discrete logic the outputs C01–C03 of the discrete logic provide the corresponding outputs C01–C03 of FIG. 3.

Although discrete logic is used in FIG. 4 to implement the controller 300 of FIG. 2, several other methods exist to implement this function. These methods include, but are not limited to, a look-up table embodied in a Read Only Memory and the use of a general purpose computer programmed to produce the controller outputs C01–C03 in response to controller inputs C1–C3. As described in the logic table of FIG. 3, additional inputs and outputs can be added to include additional accessory devices and user selected operational setting inputs.

Figure 5:
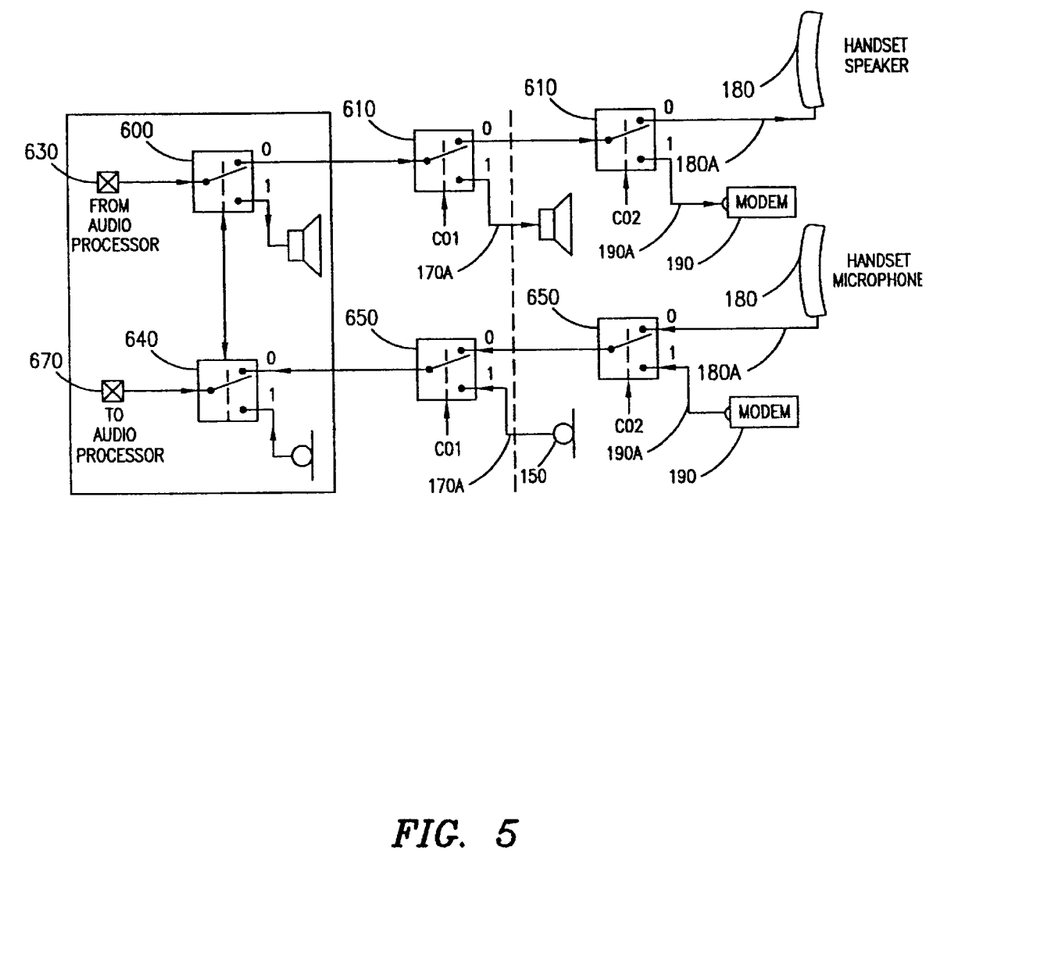
FIG. 5 illustrates an embodiment of the control switch function depicted in FIG. 2.

Referring now to FIG. 5, there is illustrated an embodiment of the control switch 310 of the interface system 100 of FIG. 2. FIG. 5 depicts the audio path from the radiotelephone 110 to the varies accessory devices and the switching which is necessary to connect the various accesssory devices to the audio channel of the radiotelephone 110. The control switch 310 of FIG. 2 is depicted in FIG. 5 as being comprised of six discrete switches. Switches 600, 610, and 620 form the switching path from the audio processor 630 of the radiotelephone 110 and switches 640, 650, and 660 form the switching path to the audio processor 670. Together the path from the audio processor 630 and the path to the audio processor 670 form the radiotelephone 110 bidirectional audio channel.

Switches 600 and 640 which either place the radiotelephone 110 in isolation or allow connection to accessory devices, are controlled by the control output C03 of the controller 310 of FIG. 2. Switches 610 and 650 which connect the speakerphone 170 to the radiotelephone 110 audio processing paths 630 and 670 are controlled by the control output C01 of the controller 310 of FIG. 2. Switches 620 and 660 connect either the handset 180 or modem 190 to the radiotelephone 110 audio processor paths 630 and 670 are controlled by the control output C02 of the controller 310 of FIG. 2.

While the embodiment of the control switch 310, depicted in FIG. 5 comprises six discrete switches for implementing the switching function, other methods for implementing the switching function are possible such as the use of a monolithic multiplexer. The discrete switches, however, can be employed to effectuate the remotely located external portion 260 of the interface system described in FIG. 1B. Furthermore, there are various ways which the switch can be controlled and wired in addition to the methods described in FIG. 3 and FIG. 5 and it is understood that the present invention is not limited to those methods described.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. An interface device for arbitrating between, and effectuating access by, a plurality of accessory devices competing for access to a radiotelephone audio channel, said interface device comprising:

a controller for controlling operations of the interface system;

a switch operatively responsive to said controller, said switch for effectuating access by the plurality of accessory devices to the radiotelephone audio channel;

a request generator for generating requests to the controller for access to the audio channel of the radiotelephone by the plurality of accessories; and a fibre optic cable coupling the plurality of accessory devices to the switch and the controller, said fibre optic cable for transmitting optical signals.

2. An interface device for arbitrating between, and effectuating access by, a plurality of accessory devices competing for access to a radiotelephone audio channel, said interface device comprising:

a controller for controlling operations of the interface system;

a switch operatively responsive to said controller, said switch for effectuating access by the plurality of accessory devices to the radiotelephone audio channel;

a request generator for generating requests to the controller for access to the audio channel of the radiotelephone by the plurality of accessories; and an electromagnetic coupler connecting the plurality of accessory devices to the switch and the controller, said electromagnetic coupler for transmitting wireless signals.

3. An interface device for arbitrating between, and effectuating access by, a plurality of accessory devices competing for access to a radiotelephone audio channel, said interface device comprising:

a controller for controlling operations of the interface system;

a switch operatively responsive to said controller, said switch for effectuating access by the plurality of accessory devices to the radiotelephone audio channel;

a request generator for generating requests to the controller for access to the audio channel of the radiotelephone by the plurality of accessories; and wherein the switch comprises:

a centrally located portion; and a remotely located portion external to the centrally located portion.

4. The interface device of claim 3, further comprising an input device for entering user-selected operational mode settings, the operational mode settings being communicated to the controller and altering operation of the controller.

5. An method for arbitrating and effectuating access by a plurality of accessory devices competing for access to a radiotelephone audio channel said method comprising the steps of:

connecting the radiotelephone audio processor to a bidirectional terminal on a first side of a switch;

connecting the plurality of accessory devices to a plurality of bidirectional terminals on a second side of the switch;

connecting the plurality of accessory devices to a controller via a request link;

generating a request by at least one of the plurality of accessory devices;

transmitting the request to the controller via the request link;

arbitrating by the controller to select between competing requests from the plurality of accessory devices for access to the audio channel of the radio telephone;

instructing the switch by the controller to connect the selected accessory to the audio processor of the radiotelephone; and switching the switch to connect the first side of the switch to the second side of the switch associated with the selected accessory.

6. The method of claim 5, further including the step of entering user-selected operational mode settings, the operational mode settings being communicated to the controller and altering operation of the controller.

7. The method of claim 5, wherein the steps of connecting the radiotelephone audio processor to a bidirectional terminal on a first side of a switch, connecting the plurality of accessory devices to a plurality of bidirectional terminals on a second side of the switch, and connecting the plurality of accessory devices to a controller are effectuated using an electrical cable for transmitting electrical signals.

8. The method of claim 5, wherein the steps of connecting the radiotelephone audio processor to a bidirectional terminal on a first side of a switch, connecting the plurality of accessory devices to a plurality of bidirectional terminals on a second side of the switch, and connecting the plurality of accessory devices to a controller are effectuated using a fibre optic cable for transmitting optical signals.

9. The method of claim 5, wherein the steps of connecting the radiotelephone audio processor to a bidirectional terminal on a first side of a switch, connecting the plurality of accessory devices to a plurality of bidirectional terminals on a second side of the switch, and connecting the plurality of accessory devices to a controller are effectuated using electromagnetic radiation for transmitting wireless signals.

* * * * *

UNITED STATES PATENT AND TRADEMARK OFFICE
CERTIFICATE OF CORRECTION

PATENT NO. : 5,884,191
DATED : Mar. 16, 1999
INVENTOR(S) : Karpus et al.

It is certified that error appears in the above-identified patent and that said Letters Patent is hereby corrected as shown below:

| | |
|---|---|
| Column 2, line 17 | Replace "1D" With --1B-- |
| Column 2, line 41 | Replace "1D" With --1B-- |
| Column 3, line 46 | After "input" Remove --is-- |
| Column 4, line 7 | Replace "he" With --be-- |

UNITED STATES PATENT AND TRADEMARK OFFICE
CERTIFICATE OF CORRECTION

PATENT NO. : 5,884,191
DATED : Mar. 16, 1999
INVENTOR(S) : Karpus et al.

It is certified that error appears in the above-identified patent and that said Letters Patent is hereby corrected as shown below:

Column 4, line 13    Replace "180D"
                        With --180B--

Column 4, line 31    Replace "he"
                        With --be--

Column 4, line 38    Replace "170D"
                        With --170B--

Column 6, line 36    Replace "accesssory"
                        With --accessory--

Signed and Sealed this

Twentieth Day of July, 1999

Attest:

Q. TODD DICKINSON

Attesting Officer    Acting Commissioner of Patents and Trademarks